United States Patent [15] 3,677,504
Schwärzler [45] July 18, 1972

[54] CONTROL FLAP ARRANGEMENT

[72] Inventor: Hans-Jurgen Schwärzler, Munich, Germany

[73] Assignee: Vereinigte Flugtechnische Werke-Fokker Gesellschaft mit beschrankter Haftung, Bremen, Germany

[22] Filed: Aug. 25, 1970

[21] Appl. No.: 66,784

[30] Foreign Application Priority Data

Aug. 28, 1969 Germany..................P 19 43 680.7

[52] U.S. Cl..................................................244/42 CC
[51] Int. Cl...........................................................B64c 9/18
[58] Field of Search............244/42 R, 42 CB, 42 CC, 42 CD, 244/42 DA, 42 DB, 40, 41, 43

[56] References Cited

UNITED STATES PATENTS 3,026,067  3/1962  Grant.....................................244/42 R
3,092,354  6/1963  Alvarez-Calderón............244/42 R X
2,276,522  3/1942  Staufer...............................244/42 DB
2,282,516  5/1942  Gropler et al. ....................244/42 DB
2,587,359  2/1952  Miláns................................244/42 C
3,259,341  7/1966  Steidl..................................244/42 CC Primary Examiner—Milton Buchler
Assistant Examiner—Carl A. Rutledge
Attorney—Spencer & Kaye

[57] ABSTRACT

A control flap arrangement for an airfoil of an aircraft has a control flap with a nose surface defined by a center of curvature. The control flap is mounted to the airfoil for pivoting movement with respect thereto, and is actuated by a fluid piston-cylinder device which is connected to the airfoil and to the control flap at a point offset from the pivot point thereof. Cover members are mounted in the slot formed between the control flap and the airfoil in such a manner that when the control flap is pivoted with respect to the airfoil the respective one of the cover members arranged in the slot on the side to which the control flap is pivoting will move away from the airfoil to divert air through the slot and the control flap will move away from the other device to form the slot.

4 Claims, 3 Drawing Figures

Patented July 18, 1972  3,677,504

INVENTOR.
Hans-Jürgen Schwärzler
BY
Spencer & Kaye
ATTORNEYS.

CONTROL FLAP ARRANGEMENT

BACKGROUND OF THE INVENTION

The present invention relates to a control flap configuration and arrangement at the profile of an aircraft having an aerodynamically effective slot between the nose of the control flap and the associated profile portion, wherein the gap can be covered at both sides by a flap disposed in the outline of the profile.

Among known slotted flaps of this type are embodiments which permit a flow-through of air in a direction from the underside, or pressure side, to the upper side, or suction side, of the control flap by arranging the covering flaps to be correspondingly pivoted by means of a lever arrangement and open a flow-through slot. This makes it possible to perform wide control flap movements without interrupting the flow. When the control flap is adjusted upwardly in the known embodiments, however, no slot is provided to prevent interruption of the flow and, thus, permit wider upward movements.

These known arrangements can not be transferred to control flaps which permit wide control movements in both directions and open the necessary flow-through slot in each case so that the flow will not be interrupted.

Wide control movements of control flaps in both directions are particularly required for control flap arrangements for pivotal wing aircraft in order to produce an aerodynamic yaw control with sufficient yaw acceleration when the wings are in the vertical position.

SUMMARY OF THE INVENTION

It is an object of the present invention to provide an arrangement permitting wide control movements of a control flap in both pivotal directions and to utilize the aerodynamic slot even with smaller control movements, as well as to provide an arrangement in which there is no residual gap in the neutral position of the control flap. It is a further object of the present invention to produce a uniformly rising or falling flow-through effect over the entire pivoting range of the control flap.

These objects, as well as others, are accomplished according to the present invention by permitting the flow to be conducted through the slot during pivoting of the control flap in both directions, from the pressure side to the suction side of the airfoil profile. A cover member disposed on the pressure side of the profile is arranged to be outwardly movable by means of guides and/or controls to form an input funnel when the control flap is pivoted. The control flap is disposed outside of the center of its nose curvature in such a manner that it releases an outlet on the suction side of the profile when the control flap is pivoted.

In order to achieve a simple constructive configuration of the kinematics of the flaps, it is proposed to have each flap connected with the profile via a four-bar linkage, and to have a drive arm disposed between each flap and the control flap and which is in communication with the control flap in the manner of a sliding block crank. This drive arm moves the covering flap at, for example, the pressure side of the airfoil in dependence on the amount the control flap is pivoted; whereas the flap at the suction side of the profile does not change its position.

A further feature of the present invention is that each flap is provided with guide elements at its side facing the slot to form a jet-type flow-through channel with the adjacent portion of the airfoil profile and with the nose of the control flap. Thus, it is possible to realize an increase in the speed of the outflowing stream and to realize an effective influence of the flow-through even with small movements of the control flap.

DESCRIPTION OF THE PREFERRED EMBODIMENTS

Figure 3:
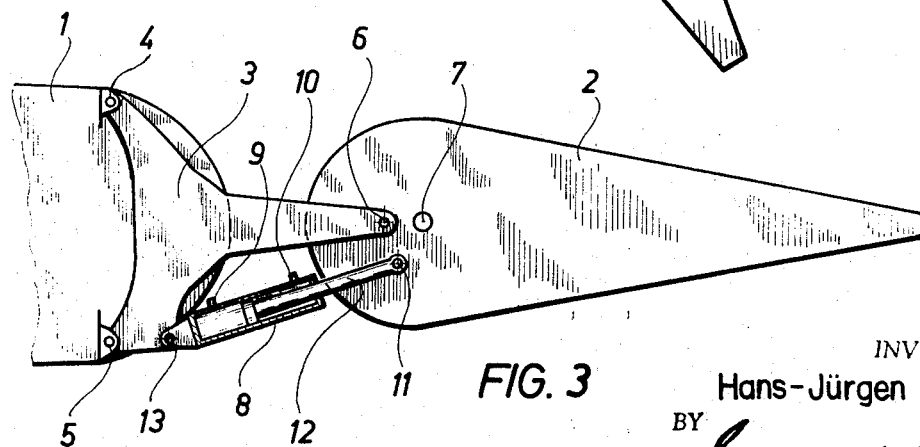
FIG. 3 is a side elevation view showing the mounting and actuation device for the control flap.

A control flap 2 is disposed in the extension of the airfoil 1 of an aircraft via a bearing arm 3 (FIG. 3). The bearing arm 3 is permanently connected with the airfoil 1 by, for example, bolts 4 and 5 and is provided with a shaft 6 on its side away from airfoil 1 about which the control flap 2 can be pivoted. Shaft 6 is disposed between the center of curvature 7 of the nose of the flap 2 and the nose portion of the control flap 2. The control flap 2 may be pivoted about shaft 6 by means of, for example, a conventional fluid actuated operating piston-cylinder 8 serving as its drive and provided with appropriate studs 9 and 10 which connect the cylinder with a known fluid source. The piston rod 12 engages the flap 2 at a predetermined distance off-set from shaft 6 by a pivotal connecting point 11 and the operating cylinder 8 is pivotally mounted at pivotal connecting point 13 to bearing arm 3. The construction of connecting points 11 and 13 is well known in the art.

Figure 1:
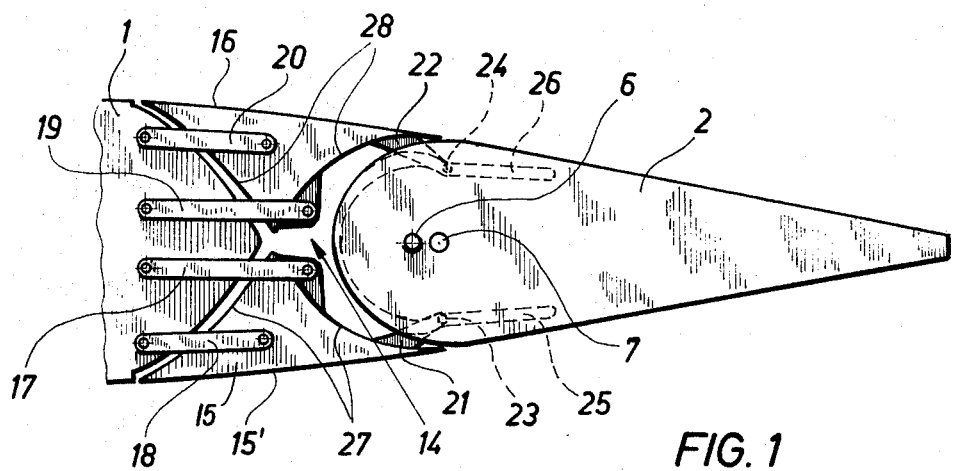
FIG. 1 is a side elevation view showing an arrangement according to the present invention having the control flap in the neutral position.

Between airfoil 1 and control flap 2 a slot 14 is formed, which in the neutral position of control flap 2 (FIG. 1) is covered by slot defining cover members or flaps 15 and 16 disposed in the outline of the profile, or section, of airfoil 1. Each cover member 15 and 16 is pivotally connected with the airfoil 1 via a four-bar linkage formed of levers 17 and 18 or 19 and 20, respectively, and is also in communication with control flap 2 by a drive arm 21 or 22, respectively. The drive arm 21 or 22 is permanently connected with cover member 15 or 16, respectively, whereas it is connected with control flap 2 via a roller 23 or 24, respectively, which is guided in a groove 25 or 26, respectively, defined in the control flap 2.

Figure 2:
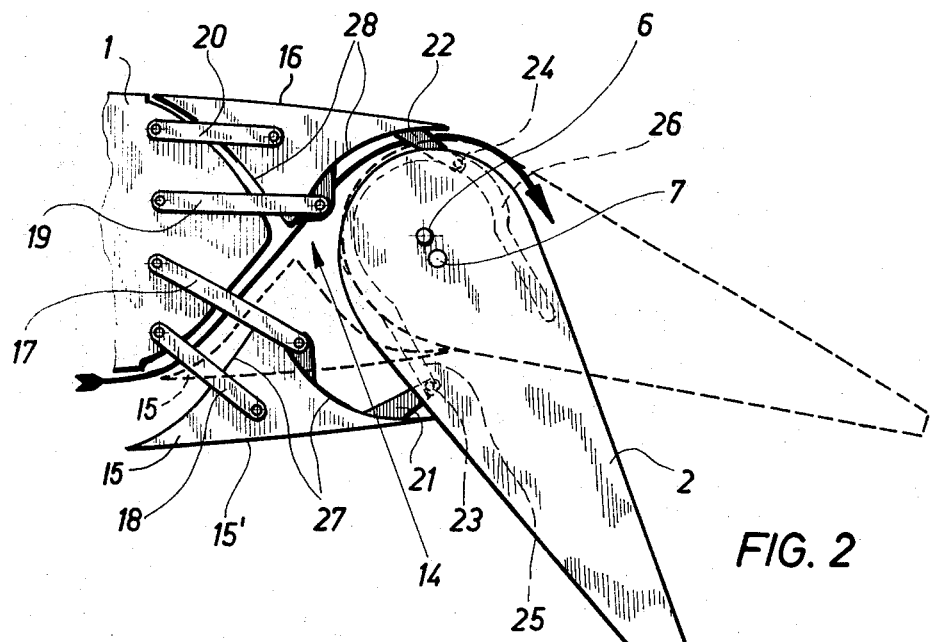
FIG. 2 is a view similar to FIG. 1 showing the control flap in a pivoted position, as well as an intermediate position of the control flap shown in dashed lines.

When pivoting the control flap 2 by means of the operating cylinder 8, the cover member 15 which is disposed on the, for example, pressure side of the airfoil 1, is moved outwardly, or away from the airfoil 1, to form an intake funnel above the drive arm 21 (FIG. 2); the movement occurring by roller 23 being guided in the groove 25 of control flap 2 in dependence on the movement of the control flap 2. Due to the particular arrangement of levers, edge 15' of cover member 15 can move outwardly only in a direction somewhat parallel to itself (FIG. 2). Cover member 16, which is, for example, on the suction side of airfoil 1, remains in its rest position since roller 24 of drive arm 22 passes through a region of groove 26 which is arranged concentrically with respect to the pivot circle of the control flap 2. The dashed lines in FIG. 2 show an intermediate position of the control flap 2 and cover member 15.

Simultaneously with the outward movement of cover member 15, control flap 2 defines an exit opening on the suction side of the airfoil by becoming positioned outside of the center of curvature 7 of the nose of flap 2 and flow-through slot 14 is created.

Slot 14 is defined by guide surfaces 27 and 28, respectively, which are, for example, formed in cover members 15 and 16, respectively, as well as by the adjacent airfoil portion and the nose portion of control flap 2, so that a jet-type pass-through channel is formed in the desired direction of flow.

When control flap 2 pivots out into the direction opposite to that shown in FIG. 2, an equivalent pivoting of cover member 16 occurs and cover member 15 remains in its rest position. This arrangement permits either side of the airfoil profile to be the pressure side.

It will be understood that the above description of the present invention is susceptible to various modifications, changes and adaptations, and the same are intended to be comprehended within the meaning and range of equivalents of the appended claims.

I claim:

1. A control flap arrangement for an airfoil of an aircraft, comprising, in combination:

a. a control flap having a nose surface defined by a center of curvature and oriented toward the airfoil;

b. means mounting said control flap to the airfoil for pivoting movement with respect to the airfoil about a pivot point between the center of curvature of the nose surface and the profile of the airfoil;

c. first and second slot defining means arranged on respective sides of said control flap and the airfoil and between said control flap and the airfoil; and d. means mounting said first and second slot defining means on said control flap and the airfoil for movement away from the airfoil to define an inlet of a slot only when said control flap is pivoted toward the respective slot defining means, and for permitting said control flap to pivot away from the other of said slot defining means to define an outlet of a slot;

e. said slot defining means which moves away from the airfoil always being on the pressure side of the airfoil.

2. The control flap arrangement defined in claim 1, wherein said mounting means has a separate four-bar linkage means associated with each of said slot defining means for connecting the respective slot defining means to the airfoil, and a separate drive arm means associated with each of said slot defining means and connected to its respective slot defining means, and wherein said control flap defines a pair of groves in each of which a respective one of said drive arm means engages to form a sliding block linkage means for causing a movement of its respective slot defining means when said control flap is pivoted toward the respective slot defining means.

3. The control flap arrangement defined in claim 2, wherein each of said first and second slot defining means is a cover member and defines at least one guide surface for forming the slot in conjunction with the nose portion of said control flap and the airfoil.

4. The control flap arrangement defined in claim 3, further including fluid piston-cylinder means for actuating said control flap, said actuating means connected to said airfoil and to said flap at a point off-set from the pivot point of said control flap and arranged so that said control flap may be pivoted in either direction with respect to the airfoil.

* * * * *